United States Patent
Itou et al.

(10) Patent No.: US 6,345,500 B2
(45) Date of Patent: *Feb. 12, 2002

(54) CYLINDER DIRECT INJECTION SPARK-IGNITION INTERNAL COMBUSTION ENGINE

(75) Inventors: Yasuyuki Itou, Yokohama; Takashi Fukuda, Kanagawa, both of (JP)

(73) Assignee: Nissan Motor Co., Ltd., Yokohama (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/342,738

(22) Filed: Jun. 29, 1999

(30) Foreign Application Priority Data

Jun. 29, 1998 (JP) .......................... 10-182316

(51) Int. Cl.[7] .................................. F01N 3/00
(52) U.S. Cl. ...................... 60/286; 60/284; 60/285; 60/274; 123/406.44; 123/406.45
(58) Field of Search .................... 60/284, 285, 286, 60/274, 300, 303; 123/676, 681, 406.44, 406.45

(56) References Cited

U.S. PATENT DOCUMENTS

| | | | |
|---|---|---|---|
| 5,068,794 A | | 11/1991 | Hosaka |
| 5,108,716 A | | 4/1992 | Nishizawa |
| 5,207,058 A | * | 5/1993 | Sasaki et al. ................. 60/284 |
| 5,263,453 A | | 11/1993 | Wakahara et al. |
| 5,642,705 A | * | 7/1997 | Morikawa et al. ........... 123/300 |
| 5,720,260 A | | 2/1998 | Meyer et al. |
| 5,778,662 A | | 7/1998 | Mori et al. |
| 5,826,425 A | * | 10/1998 | Rossi Sebastiano et al. .. 60/274 |
| 5,839,275 A | * | 11/1998 | Hirota et al. ................. 60/285 |
| 5,910,096 A | * | 6/1999 | Hepburn et al. .............. 60/274 |
| 5,947,080 A | * | 9/1999 | Weissman et al. ........... 123/300 |
| 5,975,046 A | * | 11/1999 | Kaneko et al. .............. 123/300 |
| 6,041,591 A | * | 3/2000 | Kaneko et al. ............... 60/274 |
| 6,044,642 A | * | 4/2000 | Nishimura et al. ........... 60/285 |

FOREIGN PATENT DOCUMENTS

| | | |
|---|---|---|
| DE | 195 36 098 | 4/1996 |
| DE | 196 39 937 | 4/1997 |
| JP | 8-296485 | 11/1996 |

\* cited by examiner

*Primary Examiner*—Thomas Denion
*Assistant Examiner*—Binh Tran
(74) *Attorney, Agent, or Firm*—Foley & Lardner

(57) ABSTRACT

In a cylinder injection spark-ignition engine having a spark plug to ignite an air mixture fuel within a corresponding cylinder; a fuel injector to inject fuel into a combustion chamber; a catalytic converter interposed in an exhaust passage; and a controller, the controller being programmed to: command the fuel injector to inject a main fuel into the combustion chamber for a first time duration within at least one of a suction stroke and a compression stroke and to inject an additional fuel for a second time duration within at least one of an expansion stroke and an exhaust stroke, the controller is programmed to set a target value of a total air-fuel mixture ratio to a value of the air-fuel mixture ratio which is leaner than a stoichiometric air-fuel mixture ratio for a warm-up condition of the catalytic converter and the controller is programmed to calculate respective injection quantities (Ti1 and Ti2) of the main fuel and the additional fuel in such a manner that the total air-fuel mixture ratio based on a sum of the main fuel and the additional fuel corresponds to the set target value of the total air-fuel mixture ratio.

32 Claims, 3 Drawing Sheets

CYLINDER DIRECT INJECTION SPARK-IGNITION INTERNAL COMBUSTION ENGINE

BACKGROUND OF THE INVENTION a) Field of the Invention

The present invention relates to a cylinder injection spark-ignition engine and relates specifically to a technique of quickening an activation of catalysts (catalytic converter) installed in an exhaust passage of the engine.

b) Description of the Related Art

When a temperature of the catalysts is low during an engine start under a cold ambient condition (so-called, a cold start) or when a poisoning of sulfur on catalysts or a smoke covering on the catalysts are advanced, it is demanded that the temperature of the catalysts be positively increased.

A Japanese Patent Application First Publication No. Heisei 8-296485 published on Nov. 12, 1996 exemplifies a previously proposed cylinder injection spark-ignition engine.

In the previously proposed cylinder injection engine, if the catalysts (catalytic converter or catalytic converter array) are needed to be heated, a main fuel is injected from each fuel injector at either a suction stroke or a compression stroke of each corresponding cylinder and an additional fuel is injected at the subsequent exhaust stroke thereof. In this case, an injection quantity of an additional fuel is controlled in such a manner that oxygen which is extra after the combustion of the main fuel is completely combusted.

In the above-identified Japanese Patent Application Publication, in a case where a rise in temperature of the catalysts is demanded to be more quickened, a fuel whose quantity is large to some degree and is based on a multiplication of a quantity by which the extra oxygen is completely combusted with a correction coefficient is injected as the additional fuel.

SUMMARY OF THE INVENTION

In order to increase the temperature of the catalysts as quick as possible with a supply of the additional fuel, it is effective to combust a large quantity of fuel within the exhaust passage by increasing a supply quantity of the additional quantity of the additional fuel. Specifically, in a case where the earlier activation of the catalysts is intended to be carried out midway through a warm-up of the engine, it is not only necessary to merely increase the temperature of the catalysts but also necessary to control an air-fuel mixture ratio appropriately.

For example, it is known that a temperature of the catalysts at which a purification reaction on the catalysts is started is shifted toward a lower temperature direction when the air-fuel mixture ratio is leaner to some degree with respect to the stoichiometric air-fuel mixture ratio.

However, in the previously proposed cylinder injection spark-ignition engine, a total air-fuel mixture ratio at a time when the temperature rise in the catalysts is controlled toward the air-fuel mixture ratio corresponding to the stoichiometric air-fuel mixture ratio or a richer ratio than the stoichiometric air-fuel mixture ratio.

Hence, there is a possibility that an efficient activation of the catalysts cannot always be achieved if the above-described control technique is applied to the earlier activation of the catalysts.

It is therefore an object of the present invention to provide improved cylinder injection spark-ignition engine and method applicable to the cylinder injection spark-ignition engine which can achieve an efficient activation of the catalysts.

The above-described object can be achieved by providing a cylinder injection spark-ignition engine, comprising: a spark plug to ignite an air mixture fuel in a combustion chamber; a fuel injector to inject fuel directly into the combustion chamber; a catalytic converter interposed in an exhaust passage; and a controller, programmed to: command the fuel injector to inject a main fuel into the combustion chamber for a first time duration within at least one of a suction stroke and a compression stroke and to inject additional fuel for a second time duration within at least one of an expansion stroke and an exhaust stroke; to set a target total air-fuel mixture ratio for a warm-up condition of the catalytic converter, the target total air-fuel mixture ratio being leaner than a stoichiometric air-fuel mixture ratio; and to calculate a fuel injection quantity Ti1 of the main fuel and a fuel injection quantity Ti2 of the additional fuel in such a manner that the total air-fuel mixture ratio based on a sum of the main fuel and the additional fuel corresponds to the target total air-fuel mixture ratio.

The above-described object can also be achieved by providing a method applicable to a cylinder injection spark-ignition engine, the cylinder injection spark ignition engine including: a spark plug to ignite an air mixture fuel in a combustion chamber; a fuel injector to inject fuel into a combustion chamber; and a catalytic converter interposed in an exhaust passage, the method comprising: setting a target value of a total air-fuel mixture ratio to a value of the air-fuel mixture ratio which is leaner than a stoichiometric air-fuel mixture ratio for a warm-up condition of the catalytic converter; calculating respective injection quantities Ti1 and Ti2 of the main fuel and the additional fuel in such a manner that the total air-fuel mixture ratio based on a sum of the main fuel and the additional fuel corresponds to the set target value of the total air-fuel mixture ratio; and commanding the fuel injector to inject a main fuel into the combustion chamber for a first time duration within at least one of a suction stroke and a compression stroke and to inject an additional fuel for a second time duration within at least one of an expansion stroke and an exhaust stroke.

DETAILED DESCRIPTION OF THE PREFERRED EMBODIMENT

Reference will hereinafter be made to the drawings in order to facilitate a better understanding of the present invention.

Figures 1A, 1B:
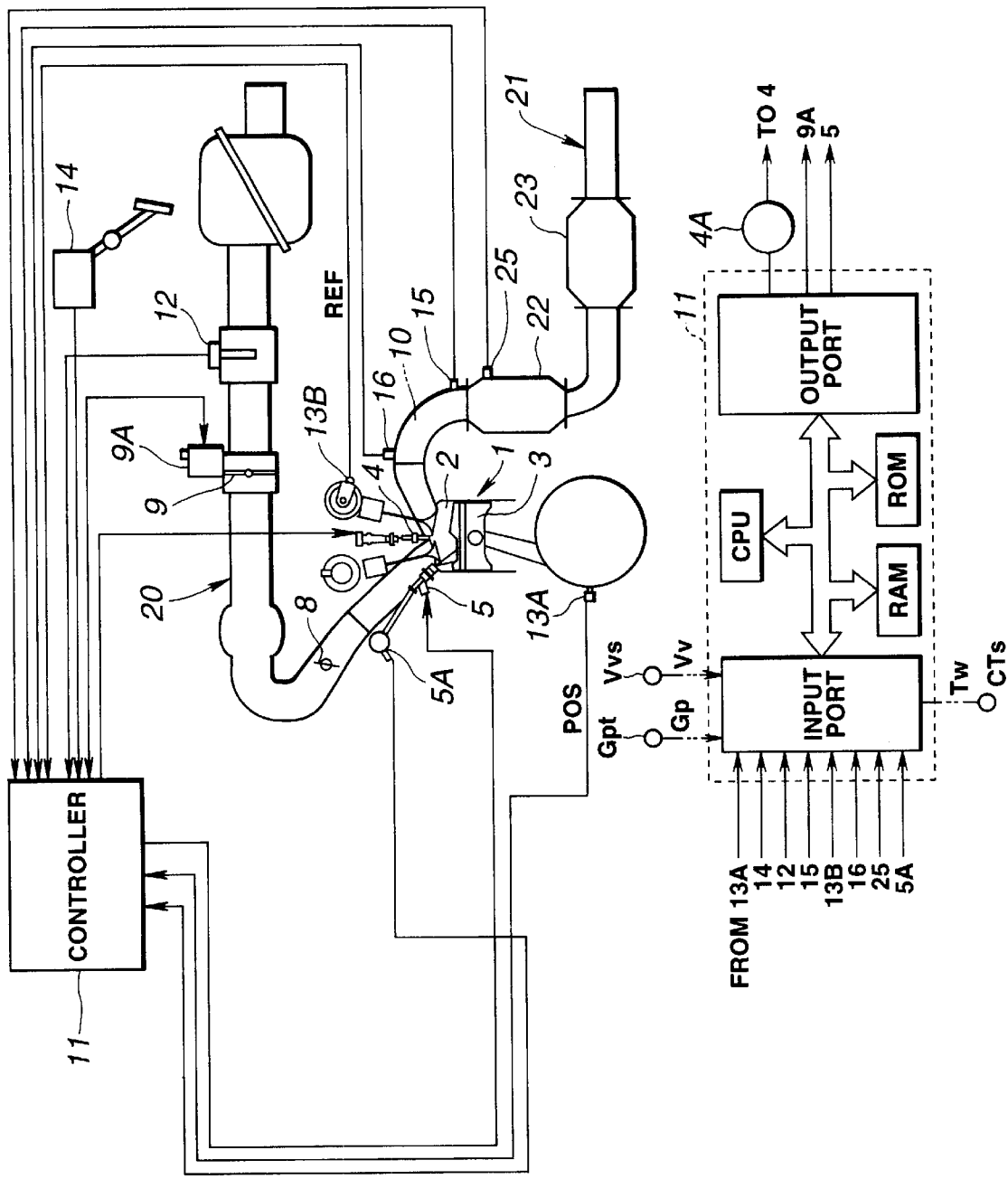
FIG. 1A is a schematic configuration view of a preferred embodiment of a cylinder injection spark-ignition engine applicable to a four-cycle (four-stroke) internal combustion engine.
FIG. 1B is a schematic circuit block diagram of a controller shown in FIG. 1A.

FIG. 1A shows a preferred embodiment of an apparatus for a spark-ignited direction injection internal combustion engine.

In FIG. 1A, an engine body 1 includes: each combustion chamber (a representative combustion chamber 2 is shown in FIG. 1A); each piston (a representative piston 3 is shown in FIG. 1A); each spark plug (a representative spark plug 3 is shown in FIG. 1A); and each fuel injector (a representative fuel injector 5 is shown in FIG. 1A) whose nozzle portion is exposed to an internal corresponding engine cylinder.

In a four-cycle engine, while the piston 3 is reciprocated twice into the corresponding cylinder, four strokes of a suction stroke, a compression stroke, an expansion stroke, and an exhaust stroke are continuously carried out.

A swirl control valve 8, a throttle valve 9, and an air-flow meter (sensor) 12 are respectively interposed within an intake air passage 20 shown in FIG. 1A.

It is noted that a throttle actuator 9A, e.g., constituted by a DC motor is connected to the throttle valve 9 to actuate the throttle valve 9 to be opened and closed.

A controller 11 is provided to control fuel injection timing and quantity of the fuel injector 5 and to control a spark timing of the spark plug 4 via an ignition device 4A.

The controller 11 receives output signals from a plurality of sensors as follows: a reference signal Ref and a position signal POS from a crank angle sensor couple 13B and 13A, the reference signal Ref being outputted whenever a cam shaft is received and the position signal being outputted whenever a crankshaft is revolved by a unit angle, e.g., 1° or 2°; an accelerator depression angle signal from an accelerator pedal depression depth sensor 14; an intake air quantity signal from the air-flow meter 12; an air-fuel mixture ratio signal (oxygen concentration signal) from an air-fuel mixture ratio sensor 15 (also-called, oxygen concentration sensor and, in broad sense of the term, a total air-fuel mixture ratio detector) installed in an exhaust passage 21; an engine coolant temperature signal Tw from a coolant temperature sensor CTs; a gear position signal Gp from a transmission associated with the engine; and a vehicular velocity signal Vv from a vehicular velocity sensor Vvs.

The controller 11, determining an engine driving condition on the basis of these sensor signals, outputs commands to the engine components such as the fuel injector 5 and spark plug 4 (via an ignition device 4A) to achieve a stratified combustion under a lean air-fuel mixture ratio when, after a catalytic converter has been warmed up, the engine falls in a predetermined driving region in which an engine load is not heavy and to achieve a homogeneous combustion under a stoichiometric air-fuel mixture ratio when the engine falls in a driving region other than the predetermined driving region.

The controller 11 includes a microcomputer having a CPU (Central Processing Unit), ROM (Read Only Memory), RAM (Random Access Memory), an Input Port, an Output Port, and a common bus, as shown in FIG. 1B.

The exhaust passage 2 is provided with two catalytic converters 22 and 23, as shown in FIG. 1A.

Each of the two catalytic converters 22 and 23 is constituted by a three-way catalytic converter of an NOx adsorbing and reducing type (so-called, NOx storage type).

The three-way catalytic converter reduces Nox in the exhaust gas components and oxidizes HC and CO in the exhaust gas components during an air mixture fuel driving under the stoichiometric air-fuel mixture ratio and adsorbs (traps) NOx generated during a lean air mixture fuel engine driving.

A sensor 25 to detect a temperature of carriers in the catalytic converters 22 and 23 (also-called, a catalytic temperature) Tcat is provided. The catalytic temperature Tcat may be estimated on the basis of the engine coolant temperature Tw detected by the engine coolant temperature sensor CTs, the engine driving condition, and an engine driving time duration from a time at which the engine 13 is started.

An exhaust gas temperature sensor 16 to detect a temperature in an exhaust manifold 10 is installed as a detector detecting an exhaust gas temperature Tex located at an upstream side of the catalytic converter 22.

It is noted that, in place of the exhaust gas temperature sensor 16, the controller 11 may estimate the exhaust gas temperature Tex on the basis of the detected engine coolant temperature Tw of the engine coolant temperature sensor CTs, the engine driving condition, and the engine driving time duration from the time at which the engine is started.

The controller 11 inputs the catalytic temperature Tcat detected by the catalytic temperature sensor 25, compares Tcat with its threshold value TcatTH to determine whether the catalytic converter has been warmed up, and outputs commands to inject a main fuel during the compression stroke of the corresponding engine cylinder and to inject an additional fuel through the fuel injector 5 during the subsequent expansion stroke. The controller 11 outputs a command to ignite the main fuel during the compression stroke through the spark plug 4 when the catalytic converter has been warmed up.

It is noted that a re-ignition to the additional fuel may be carried out at the subsequent expansion stroke or exhaust stroke. It is also noted that the main fuel may be injected at both of the suction stroke and the compression stroke. It is further noted that the additional fuel may be injected at both of the expansion and exhaust strokes.

Then, the additional fuel injection quantity Ti2 is controlled in such a manner that a total air-fuel mixture ratio of the air mixture fuel formed in the combustion chamber 2 by means of the main fuel injection and the additional fuel injection is approached to a target air-fuel mixture ratio set to a leaner side than the stoichiometric air-fuel mixture ratio. As the result of this, the catalyst can efficiently be activated.

Figure 2:
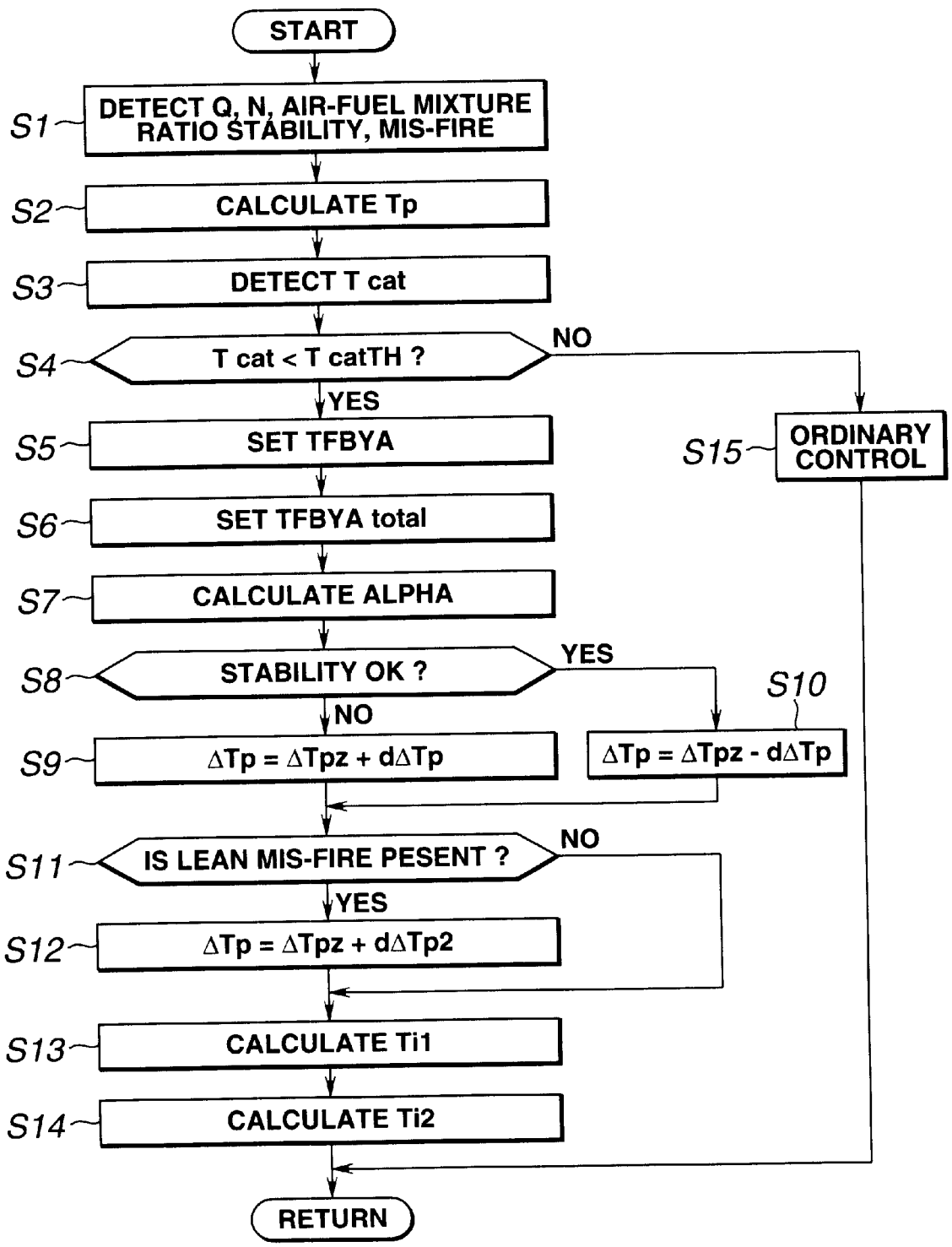
FIG. 2 is an operational flowchart executed in the controller shown in FIG. 1A.

FIG. 2 shows an operational flowchart executed in the controller 11 for each predetermined period of time (for example, 10 milliseconds) for calculating the injection quantities of the main fuel and the additional fuel, respectively.

Figure 4:
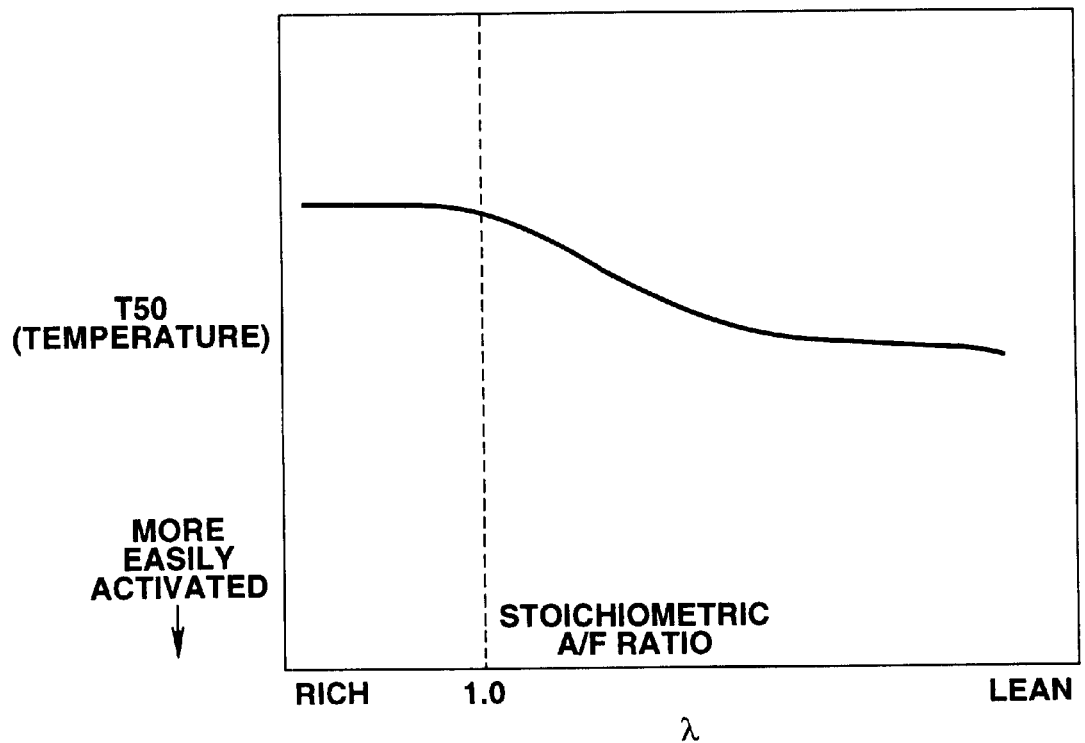
FIG. 4 is a characteristic graph representing a relationship between a temperature of the catalysts T50 and an excess coefficient (λ).

As shown in FIG. 4, the controller 11 calculates the main fuel injection quantity Ti1 and the additional injection quantity Ti2, respectively.

In FIG. 2, the CPU of the controller 11 reads the intake air quantity Q, the engine speed N, the air-fuel mixture, a combustion stability, and presence or absence of the misfire. The combustion stability is calculated on the basis of a variation in the engine speed N calculated on the basis of the reference signal Ref or the position signal from one of the crank angle sensor couple 13A or 13B. The presence or absence of the misfire is determined depending upon whether the exhaust gas temperature Tex is largely reduced. When it is largely reduced, the misfire occurs.

At the subsequent step S2, the CPU of the controller 11 calculates a basic fuel injection quantity Tp based on the intake quantity Q and the engine speed N and which is a fuel injection quantity by which the stoichiometric air-fuel mixture is obtained.

At the subsequent steps S3 and S4, the CPU of the controller 11 reads the catalytic temperature Tcat from the catalytic temperature sensor 25 (or estimates the catalytic temperature Tcat described above) and compares Tcat with a predetermined activation threshold value TcatTH to determine whether Tcat>TcatTH.

It is noted that the threshold value TcatTH is a threshold value at a boundary of which either such a catalytic inactivated state that an uncombusted HC less than 90% is oxidized via the catalytic converter or such a catalysts activated state that the uncombusted HC equal to or greater than 90% is oxidized via the catalysts is determined.

If Tcat<TcatTH (Yes) at the step S4, the CPU of the controller 11 determines that the catalysts inactive state and the engine falls in the catalytic converter warmed-up state and the routine goes to steps S5 through S14 as will be described below.

At this time, the main fuel injection is carried out at the compression stroke and the additional fuel injection is carried out at the expansion stroke.

At step S5, the CPU of the controller 11 sets a correction coefficient TFBYA to make the air-fuel mixture ratio of the air fuel mixture formed in the combustion chamber 2 through the main fuel injection.

Figure 3:
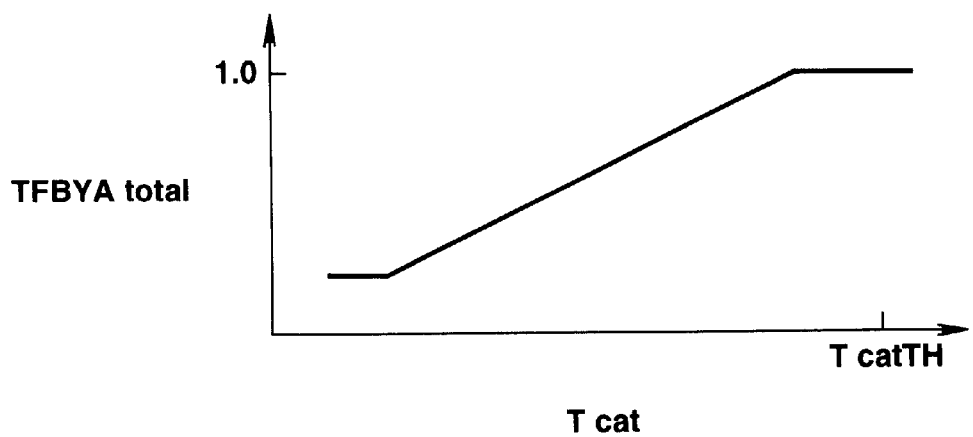
FIG. 3 is a characteristic graph representing a relationship between a correction coefficient (TFBYAtotal) and a temperature of catalysts (catalytic temperature) (Tcat).

At the step S6, the CPU of the controller 11 searches a total correction coefficient TFBYAtotal to make the total air-fuel mixture ratio of the air mixture fuel formed in the combustion chamber 2 in response to the main fuel injection and the additional fuel injection approach to a target value thereof from a map shown in FIG. 3 with respect to the catalytic temperature Tcat.

The map shown in FIG. 3 is such that when the value of Tcat is placed in a proximity to the threshold value TcatTH, the total correction coefficient indicates 1 and indicates a value gradually smaller than 1 as the value of Tcat becomes lower than the threshold value.

Hence, as the catalytic temperature Tcat becomes lower, the total air-fuel mixture ratio becomes gradually shifted to a lean ratio side.

It is noted that the correction coefficient TFBYA set at the step S5 is set at a range smaller than the total correction coefficient TFBYAtotal.

Hence, the air-fuel mixture ratio when the main fuel injection is carried out and is combusted becomes leaner than the total air-fuel mixture ratio (total A/F). The steps S5 and S6 correspond to a target total air-fuel mixture ratio setter.

At the step S7, the CPU of the controller 11 calculates an air-fuel mixture ratio feedback correction coefficient ALPHA according to a difference between the air-fuel mixture ratio corresponding to the total correction coefficient TFBYAtotal and actual air-fuel mixture ratio.

At the step S8, the CPU of the controller 11 determines whether the combustion stability of the engine shown in FIG. 1 falls within an allowance range.

If the stability falls out of the allowance range (No), the routine goes to the step S9 in which the CPU of the controller 11 increases a stability feedback correction coefficient $\Delta Tp$ by a predetermined value d $\Delta Tp$ from its previous value $\Delta Tpz$ ($\Delta Tp=\Delta Tpz+\Delta Tp$) to increment the main fuel injection quantity Ti1.

If the stability falls in the allowance range (Yes) at the step S8, the routine jumps to the step S10 in which the stability feedback correction coefficient $\Delta Tp$ is decreased from its previous value $\Delta Tpz$ by the predetermined value of d$\Delta Tp$ ($\Delta Tp=\Delta Tpz-d\Delta Tp$) in order to decrement the main fuel injection quantity Ti1.

At the step S11, the CPU of the controller 11 determines whether the misfire has occurred.

If the misfire has occurred (Yes) at the step S11, the routine goes to the step S12 in which the stability feedback correction coefficient $\Delta Tp$ is increased from its previous value $\Delta Tpz$ by a second predetermined value d $\Delta$ Tp2 to increase the main fuel injection quantity Ti1.

If the misfire has not occurred (No) at the step S11, the routine jumps to the step S13 without passing the step S12.

At the subsequent step S13, the CPU of the controller 11 calculates a final main fuel injection quantity Ti1 as follows:

$$Ti1 = Tp \times TFBYA \times \Delta Tp \quad (1).$$

At the subsequent step S14, the CPU of the controller 11 calculates a final additional fuel injection quantity Ti2 as follows:

$$Ti2 = Tp \times TFBYAtotal \times ALPHA - Ti1 \quad (2).$$

The steps S8 through S14 correspond to a fuel injection quantity calculator.

It is noted that if Tcat≧TcatTH (No) at the step S4, the CPU of the controller 11 determines the catalytic converter activated state and the routine goes to a step S15 in which a normal fuel injection control according to the engine driving condition is carried out.

Next, an operation of the preferred embodiment will be described below.

When the temperature of each catalytic converter 22 and 23 (hereinafter, referred to as a catalytic temperature) Tcat is lower than the threshold temperature value TcatTH, the main fuel injection is carried out at a later interval of time in the compression stroke of the corresponding cylinder and the additional fuel injection is carried out in the subsequent expansion stroke. The additional fuel is combusted in the combustion chamber 2, the exhaust passage 21, or the catalytic converter 22 to fasten the activation of the catalytic converter array.

If the total air-fuel mixture ratio of the air mixture fuel formed by the main fuel and the additional fuel during the warmed-up state of the catalytic converter array is controlled to become a lean side with respect to the stoichiometric air-fuel mixture ratio, a temperature at which an oxidization reaction of HC on the catalysis is started becomes reduced and a purification efficiency of HC becomes increased.

Consequently, the purification of the exhaust gas via the catalytic converter array, e.g., during an earlier interval of time during a warm-up period of the engine can be advanced.

First, since the controller 11 derives the fuel injection quantity Ti1 of the main fuel so that the fuel injection quantity which provides the engine output is secured at the earlier time, the engine can stably be driven.

Thereafter, since the control over the total air-fuel mixture ratio is carried out with the correction for the fuel injection quantity Ti2 of the additional fuel, the air-fuel mixture ratio can be controlled without the increase or decrease in the fuel injection quantity Ti1 of the main fuel contributing to a combustion stability.

FIG. 4 shows a relationship between the total air-fuel mixture ratio of the air mixture fuel formed in the combustion chamber 2 and the catalytic converter activation temperature T50 at which 50% or more of the uncombusted fuel is oxidized via the catalytic converter.

As shown in FIG. 4, it will be appreciated that the activation temperature T50 becomes reduced as the total air-fuel mixture ratio becomes lower than the stoichiometric air-fuel mixture ratio.

It is noted that a lateral axis of FIG. 4 denotes an excess coefficient λ (λ=1 indicates the stoichiometric air-fuel ratio).

The total air-fuel mixture ratio of the air mixture fuel formed by the main fuel and additional fuel is gradually leaned as the catalytic temperature Tcat becomes lower than the activation temperature threshold value TcatTH so that the purification efficiency of HC can be enhanced according to the catalytic temperature Tcat and the purification of HC can be carried out at an earlier stage.

As the catalytic temperature Tcat approaches to the activation temperature threshold value TcatTH, the total air-fuel mixture ratio is gradually approached to the stoichiometric air-fuel mixture ratio and the purification efficiency of NOx can be enhanced according to the catalytic temperature Tcat.

If the air-fuel mixture ratio of the air mixture fuel is leaned within the range in which the combustion stability of the engine is secured, it becomes possible to increase the fuel additionally injected by the quantity which compensates for the leaned air mixture fuel described above.

Therefore, the additional fuel can hasten the activation of the catalysis by means of the heat generated by the additional fuel combusted in the combustion chamber 2, the exhaust passage 26, or the catalytic converter 22.

If misfire occurs during the combustion of the main fuel, there is a possibility that a large quantity of fuel is exhausted with no combustion thereof passing through the two catalytic converters (the catalytic converter array 22 and 23).

When the misfire is detected, the fuel quantity Ti1 of the main fuel is increased so that a worsening of the engine combustion stability due to the occurrence of the misfire can speedily be eliminated.

Then, it becomes possible to increase the fuel to be additionally injected by a quantity which compensates for the leaned air-fuel mixture ratio of the air mixture fuel formed by the main fuel in the range in which no misfire occurs.

Consequently, the heat generated due to the combustion of the additional fuel into the combustion chamber 2, the exhaust passage 21, or the catalytic converter 22, or so forth can hasten the catalytic activation.

As an alternative of the embodiment, with the total correction coefficient TFBYAtotal fixed to "1" during the catalytic converter warm-up state, a balance between a gain to lean the air-fuel mixture ratio and a gain to enrich the air-fuel mixture ratio in the feedback control of the air-fuel mixture ratio may be varied to make the air-fuel mixture ratio shift to the lean side.

In this alternative case, it becomes possible to use an $O_2$ sensor (Oxygen concentration sensor) whose output is reversed along with the air-fuel mixture varied in a vicinity to the stoichiometric air-fuel mixture ratio detector. Hence, the cost to manufacture and assemble the engine can be reduced.

It is noted that a fuel injection timing subroutine is started upon the calculation of the final injection quantity Ti1 of the main fuel at the step S13 of FIG. 2.

That is to say, the controller 11 shown in FIG. 1A outputs a pulse signal (command signal) having a pulsewidth corresponding to the final injection quantity Ti1 of the main fuel calculated at the step S13 to one of the fuel injectors (5 in FIG. 1A) whose corresponding cylinder is at the intake (suction) stroke or the subsequent compression stroke. In a case of a four-cylinder engine, one of four fuel injectors 5 receives sequentially the pulse signal at its suction or its subsequent compression stroke.

It is also noted that another fuel injection timing subroutine is started upon the calculation of the final injection quantity Ti2 of the additional fuel at the step S14 of FIG. 2. That is to say, the controller 11 outputs the pulse signal (command signal) having the pulsewidth corresponding to the final injection quantity Ti2 of the additional fuel calculated at the step S14 of FIG. 2 to one of the fuel injectors 5 whose corresponding cylinder is at its subsequent expansion or exhaust stroke.

Which cylinder of the four cylinders is at one of the four strokes and which crank angle the fuel injection should be started are determined on the basis of the crank angle reference signal Ref and crank angle position signal Pos from the pair of the crank angle sensors 13A and 13B shown in FIG. 1A.

These fuel injection timing subroutines may be combined to a single fuel injection timing subroutine for the main and additional fuel quantities Ti1 and Ti2 which is started upon the calculation at the step S14 of FIG. 2.

In addition, these subroutines are described in the Japanese Patent Application First Publication No. Heisei 8-296485 described in the BACKGROUND OF THE INVENTION.

The division of the fuel injection timing onto the injection timing for the main fuel and that for the additional fuel is exemplified by a U.S. Pat. No. 5,068,794 issued on Nov. 26, 1991(, the disclosure of which being herein incorporated by reference).

A first time duration between a suction stroke and the subsequent compression stroke defined in claims may be interpreted as at either or both the suction stroke and/or the subsequent compression stroke and a second time duration between the subsequent expansion stroke and the exhaust stroke defined in claims may be interpreted as at either or both of the subsequent expansion stroke and/or the exhaust stroke.

In addition, it is noted that the total air-fuel mixture ratio is used in the specification to mean a ratio of the intake air quantity sucked into the combustion chamber 2 to a gross fuel injection quantity (the sum of the main fuel injection quantity and the additional fuel injection quantity).

It is also noted that the term of the misfire is exemplified by a U.S. Pat. No. 5,263,453 issued on Nov. 23, 1993, the term of the combustion stability is exemplified by a U.S. Pat. No. 5,720,260 issued on Feb. 24, 1998, and the two catalytic converters (the catalytic converter array) are exemplified by a U.S. Pat. No. 5,108,716 issued on Apr. 28, 1992. (The disclosures of these United States Patents are herein incorporated by reference.)

It is natural that the paragraph defined in some claims that the controller programmed to inject a main fuel into the combustion chamber for a first time duration within at least one of a suction stroke and a compression stroke should be interpreted as the controller programmed to inject a main fuel into the combustion chamber for a first time duration within only a suction stroke, within only a compression stroke, and within both of the suction stroke and the compression stroke. In the same way, the paragraph defined in the same claims that the controller programmed to inject an additional fuel for a second time duration within at least one of an expansion stroke and an exhaust stroke should be interpreted as the controller programmed to inject an additional fuel for a second time duration within only an expansion stroke, within only an exhaust stroke, and within both of the expansion stroke and the exhaust stroke.

The entire contents of a Japanese Patent Application P10-182316 (filed in Japan on Jun. 29, 1998) is herein incorporated by reference.

Although the invention has been described above by reference to the embodiment of the invention, the invention is not limited to the embodiment described above.

Modifications and variations of the embodiment described above will occur to those skilled in the art, in light of the above teachings.

What is claimed is:

1. A cylinder injection spark-ignition engine, comprising:
   a spark plug to ignite an air mixture fuel in a combustion chamber;
   a fuel injector to inject fuel directly into the combustion chamber;
   a catalytic converter interposed in an exhaust passage;
   a temperature sensor for sensing a temperature Tcat of said catalytic converter;
   an airflow sensor for sensing and determining the amount of air being inducted into the engine; and
   a controller, programmed to:
      command the injector to inject a main injection of a fuel injection quantity Ti1 into the combustion chamber for a first time duration within at least one of a suction stroke and a compression stroke and to inject a sub injection of an additional fuel injection quantity Ti2 for a second time duration within at least one of an expansion stroke and an exhaust stroke;
      to set a target total air-fuel mixture ratio for a warm-up condition of the catalytic converter depending on the sensed catalytic converter temperature Tcat, the target total air-fuel mixture ratio being leaner than a stoichiometric air-fuel mixture ratio;
      to calculate a total fuel injection amount of the main and sub injections based on the target A/F ratio and the amount of airflow; and
      to split the total fuel injection into the main and sub injections in such a manner that the sum of the main and additional amounts is equal to the total fuel injection.

2. A cylinder injection spark-ignition engine as claimed in claim 1, wherein the controller is programmed to calculate the fuel injection quantity Ti1 of the main fuel in such a manner that the air-fuel mixture ratio caused by the main fuel injection indicates a predetermined lean air-fuel mixture ratio and to calculate the fuel injection quantity Ti2 of the additional fuel in such a manner that the sum of the fuel injection quantity Ti2 of the additional fuel with the fuel injection quantity Ti1 of the main fuel provides a fuel quantity corresponding to the target value of the total air-fuel mixture ratio.

3. A cylinder injection spark-ignition engine as claimed in claim 2, further comprising a combustion stability detector detecting a combustion stability of the engine and wherein the controller is programmed to correctively calculate the injection quantity Ti1 of the main fuel, decreasing the injection quantity Ti1 of the main fuel when the combustion stability is higher than a predetermined value of the stability and to calculate the injection quantity Ti2 of the additional fuel on the basis of the corrected injection quantity Ti1 of the main fuel.

4. A cylinder injection spark-ignition engine as claimed in claim 2, further comprising a misfire detector to detect an occurrence of a misfire in the engine and wherein the controller is programmed to correctively calculate the injection quantity Ti1 of the main fuel, increasing the injection quantity when the occurrence of the misfire is detected, and is programmed to calculate the injection quantity Ti2 of the additional fuel based on the corrected injection quantity Ti1 of the main fuel.

5. A cylinder injection spark-ignition engine as claimed in claim 2, further comprising an air-fuel mixture ratio detector to detect the air-fuel mixture ratio in the exhaust passage and wherein the controller is programmed to correct at least one of the injection quantities Ti1, Ti2 of the main fuel and the additional fuel in such a manner that the detected air-fuel mixture ratio is approached to the target value of the total air-fuel mixture ratio.

6. A cylinder injection spark-ignition engine as claimed in claim 5, wherein the controller is programmed to correct the injection quantity Ti2 of the additional fuel in such a manner that the detected air-fuel mixture ratio approaches to the target value of the total air-fuel mixture ratio.

7. A cylinder injection spark-ignition engine as claimed in claim 1, wherein said controller is programmed to set the target value of the total air-fuel mixture ratio so that it becomes gradually leaner than the stoichiometric air-fuel mixture ratio as the catalytic converter temperature Tcat reduces.

8. A cylinder injection spark-ignition engine as claimed in claim 7, wherein the controller is programmed to compare the detected temperature of the catalytic converter Tcat with a predetermined activation temperature threshold value TcatTH to determine whether the detected temperature Tcat is lower than the predetermined activation temperature threshold value TcatTH and to set a first correction coefficient TFBYA being used to make the air-fuel mixture of the air mixture fuel formed in the combustion chamber during the injection of the main fuel equal to the target value of the air-fuel mixture ratio, to set a total correction coefficient TFBYAtotal used to make a total air-fuel mixture ratio of the air mixture fuel formed in the combustion chamber and caused by the injections of the main fuel and the additional fuel approach to the target value of the air-fuel mixture ratio according to the temperature of the catalytic converter, the total correction coefficient TFBYAtotal being reduced toward a value less than one as a difference from the detected catalytic temperature Tcat to the predetermined activation temperature threshold value TcatTH becomes larger in a negative direction.

9. A cylinder injection spark-ignition engine as claimed in claim 8, wherein the controller is programmed to calculate an air-fuel mixture ratio feedback correction coefficient ALPHA according to a difference between the air-fuel mixture ratio corresponding to the total correction coefficient TFBYAtotal and an actual air-fuel mixture ratio.

10. A cylinder injection spark-injection engine as claimed in claim 1, wherein said controller is programmed to set the target value of the total air-fuel mixture ratio so that it becomes leaner with a direct correlation with a reduction in catalytic converter temperature Tcat.

11. A cylinder injection spark-injection engine as claimed in claim 1, wherein said controller is programmed to set the target value of the total air-fuel mixture ratio so that it varies with a direct correlation with a change in catalytic converter temperature Tcat.

12. A cylinder injection spark-injection engine as claimed in claim 1, wherein said controller is programmed to set the target value of the total air-fuel mixture ratio with respect to Tcat so that the total air-fuel mixture varies with a direct one-to-one correlation with a change in catalytic converter temperature Tcat.

13. A cylinder injection spark-ignition engine comprising:
   a spark plug to ignite an air mixture fuel in a combustion chamber;
   a fuel injector to inject fuel directly into the combustion chamber;
   a catalytic converter interposed in an exhaust passage;
   a catalytic temperature detect a catalytic temperature Tcat of the catalytic converter; and a controller, programmed to:
commandthe injector to inject a main fuel amount into the combustion chamber for a first time duration within at least one of a suction stroke and a compression stroke and to inject an additional fuel amount for a second time duration within a least one of an expansion stroke and an exhaust stroke;

to set a target total air-fuel mixture ratio for a warm-up condition of the catalytic converter, the target total air-fuel mixture ratio being leaner than a stoichiometric air-fuel mixture ratio;

to calculate a fuel injection quantity Ti1 of the main fuel amount and a fuel injection quantity Ti2 of the additional fuel amount in such a manner that the total air-fuel mixture ratio based on a sum of the main fuel amount and the additional fuel amount corresponds to the target total air-fuel mixture ratio;

to set the target value of the total air-fuel mixture ratio to the value of the air-fuel mixture ratio leaner than the stoichiometric air-fuel mixture ratio as the catalytic temperature Tcat becomes lower;

to compare the detected temperature of the catalytic converter Tcat with a predetermined activation temperature threshold value TcatTH to determine whether the detected temperature Tcat is lower than the predetermined activation temperature threshold value TcatTH and to set a first correction coefficient TFBYA being used to make the air-fuel mixture of the air mixture fuel formed in the combustion chamber during the injection of the main fuel equal to the target value of the air-fuel mixture ratio, to set a total correction coefficient TFBYAtotal used to make a total air-fuel mixture ratio of the air mixture fuel formed in the combustion chamber and caused by the injections of the main fuel amount and the additional fuel amount approach the target value of the air-fuel mixture ratio according to the temperature of the catalytic converter, the total correction coefficient TFBYAtotal being reduced toward a value less than one as a different from the detected catalytic temperature Tcat to the predetermined activation temperature threshold value TcatTH becomes larger in a negative direction;

to calculate an air-fuel mixture ratio feedback correction coefficient ALPHA according to a difference between the air-fuel mixture ratio corresponding to the total correction coefficient TFBYAtotal and an actual air-fuel mixture ratio; and to determine whether an engine combustion stability falls in an allowance range and to set a stability factor feedback correction coefficient $\Delta Tp$ as follows depending upon whether the combustion stability falls in the allowance range: $\Delta Tp=\Delta Tpz+d\Delta Tp$ when the combustion stability falls within the allowance range; and $\Delta Tp=\Delta Tpz-d\Delta Tp$ when the combustion stability falls out of the allowance range, wherein $\Delta Tp$ denotes the present stability factor feedback correction coefficient, $\Delta Tpz$ denotes a predetermined value of the stability factor feedback correction coefficient.

14. A cylinder injection spark-ignition engine as claimed in claim 13, wherein the controller is programmed to determine whether a misfire occurs and wherein the controller is programmed to correct the stability factor feedback correction coefficient $\Delta Tp$ as follows when the misfire occurs: $\Delta TP=\Delta Tpz+d\Delta Tp2$ wherein $d\Delta Tp2$ denotes another predetermined value of the stability factor feedback correction coefficient.

15. A cylinder injection spark-ignition engine as claimed in claim 14, wherein the controller is programmed to calculate finally the fuel injection quantity Ti1 of the main fuel as follows: $Ti1=Tp\times TFBYA\times \Delta Tp$, wherein $Tp=K\times Q/N$, wherein K denotes a constant, Q denotes an intake air quantity, and N denotes an engine speed and finally calculates the injection quantity Ti2 of the additional fuel as follows: $Ti2=Tp\times TFBYAtotal\times ALPHA-Ti1$.

16. A cylinder injection spark-ignition engine, comprising:
spark plug means for igniting an air mixture fuel in a combustion chamber;
fuel injecting means for injecting fuel directly into the combustion chamber;
catalytic converting means interposed in an exhaust passage for treating exhaust gases emitted from the combustion chamber;
temperature sensor means for sensing the temperature of a catalyst in said catalytic converter;
controlling means for:
commanding the fuel injecting means to inject a main fuel amount into the combustion chamber for a first time duration within at least one of a suction stroke and a compression stroke and to inject an additional fuel amount for a second time duration within at least one of an expansion stroke and an exhaust stroke,
setting a target total air-fuel mixture ratio for a warm-up condition of the catalytic converter depending on the sensed catalyst temperature, leaner than a stoichiometric air-fuel mixture ratio,
calculating a total fuel injection amount of the main fuel amount and the additional fuel amount based on the target A/F ratio and the amount of airflow; and
splitting the total fuel injection into the main fuel injection amount and additional fuel amounts in such a manner that the sum of the main and additional amounts is equal to the total fuel injection.

17. A cylinder injection spark-injection engine as claimed in claim 16, wherein said controlling means is programmed to set the target value of the total air-fuel mixture ratio so that it becomes leaner with a direct correlation with a reduction in catalytic converter temperature Tcat.

18. A cylinder injection spark-injection engine as claimed in claim 16, wherein said controlling means is programmed to set the target value of the total air-fuel mixture ratio so that it varies with a direct correlation with a change in catalytic converter temperature Tcat.

19. A cylinder injection spark-injection engine as claimed in claim 16, wherein said controlling means is programmed to set the target value of the total air-fuel mixture ratio with respect to Tcat so that the total air-fuel mixture varies with a direct one-to-one correlation with a change in catalytic converter temperature Tcat.

20. A method applicable to a cylinder injection spark-ignition engine, the cylinder injection spark ignition engine including: a spark plug to ignite an air mixture fuel in a combustion chamber; a fuel injector to inject fuel into a combustion chamber; a catalytic converter interposed in an exhaust passage, and a temperature sensor to sense a temperature of the catalytic converter, the method comprising:
sensing the catalytic converter temperature;
sensing the amount of air being inducted into the engine;
setting a target value of a total air-fuel mixture ratio to a value of the air-fuel mixture ratio which is leaner than a stoichiometric air-fuel mixture for a warm-up condition of the catalytic converter depending on the sensed catalytic converter temperature;

determining a total fuel injection amount using the target air-fuel ratio and the amount of air being inducted into the engine;

setting a predetermined air-fuel ratio at a value which is leaner than the target value;

calculating a main fuel injection amount Ti1 based on the predetermined air-fuel ratio and the amount of air being inducted into the engine;

calculating an additional fuel injection amount Ti2 by subtracting the main fuel injection amount Ti1 from the total fuel injection amount; and commanding the fuel injector to inject the main fuel injection amount Ti1 into the combustion chamber for a first time duration within at least one of a suction stroke and a compression stroke and to inject the additional fuel injection amount Ti2 for a second time duration within at least one of an expansion stroke and an exhaust stroke.

21. A method as claimed in claim 20, wherein the step of setting the target value of the total air-fuel mixture ratio comprises setting the target value of the total air-fuel mixture ratio so that it becomes leaner with a direct correlation with a reduction in catalytic converter temperature Tcat.

22. A method as claimed in claim 20, wherein the step of setting the target value of the total air-fuel mixture ratio comprises setting the target value of the total air-fuel mixture ratio so that it varies with a direct correlation with a change in catalytic converter temperature Tcat.

23. A method as claimed in claim 20, wherein the step of setting the target value of the total air-fuel mixture ratio comprises setting target value of the total air-fuel mixture ratio with respect to Tcat so that the total air-fuel mixture ratio varies with a direct one-to-one correlation with a change in catalytic converter temperature Tcat.

24. A cylinder injection spark-ignition engine, comprising:

a fuel injector which injects fuel directly into a combustion chamber;

a catalytic converter interposed in an exhaust passage operatively connected with the combustion chamber;

a temperature sensor for sensing a temperature Tcat of catalytic material in said catalytic converter; and a controller, programmed to:

establish, prior to fuel injection, a predetermined target total air-fuel mixture ratio for a warm-up condition of the catalytic material depending on the sensed catalytic converter temperature Tcat, the target total air-fuel mixture ratio being leaner than a stoichiometric air-fuel mixture ratio;

calculate a fuel injection quantity Ti1 of the main fuel amount and a fuel injection quantity Ti2 of the additional fuel amount in such a manner that the actual total air-fuel mixture ratio resulting from the main fuel amount and the additional fuel amount will coincide with the predetermined target total air-fuel mixture ratio;

command the injector to inject a main fuel amount into the combustion chamber for a first time duration within at least one of a suction stroke and a compression stroke; and command the injector to inject an additional fuel amount for a second time duration within a least one of an expansion stroke and an exhaust stroke and form a total actual air-fuel mixture which enters the catalytic converter that coincides with the predetermined total target air-fuel mixture.

25. A cylinder injection spark-injection engine as claimed in claim 24, wherein said controller is programmed to establish the predetermined target total air-fuel mixture ratio so that it becomes leaner with a direct correlation with a reduction in catalytic converter temperature Tcat.

26. A cylinder injection spark-injection engine as claimed in claim 15, wherein said controller is programmed to establish the predetermined target total air-fuel mixture ratio so that it varies with a direct correlation with a change in catalytic converter temperature Tcat.

27. A cylinder injection spark-injection engine as claimed in claim 15, wherein said controller is programmed to establish the predetermined target total air-fuel mixture ratio so that it varies with a direct one-to-one correlation with a change in catalytic converter temperature Tcat.

28. A cylinder injection spark-ignition engine, as set forth in claim 24, wherein the target total air-fuel mixture ratio varies in accordance with a variation with the sensed temperature Tcat of the catalytic material.

29. A method of operating a spark-ignition engine, comprising:

injecting fuel directly into a combustion chamber using a fuel injector;

interposing a catalytic converter in an exhaust passage operatively communicated with the combustion chamber;

sensing a temperature Tcat of catalytic material in said catalytic converter using a temperature sensor:

establishing, prior to fuel injection, a predetermined target total air-fuel mixture ratio for a warm-up condition of the catalytic material depending on the sensed catalytic converter temperature Tcat, the target total air-fuel mixture ratio being leaner than a stoichiometric air-fuel mixture ratio;

calculating a fuel injection quantity Ti1 of the main fuel amount and a fuel injection quantity Ti2 of the additional fuel amount in such a manner that the actual total air-fuel mixture ratio resulting from the main fuel amount and the additional fuel amount will coincide with the predetermined target total air-fuel mixture ratio;

commanding the injector to inject a main fuel amount into the combustion chamber for a first time duration within at least one of a suction stroke and a compression stroke; and commanding the injector to inject an additional fuel amount for a second time duration within a least one of an expansion stroke and an exhaust stroke to form a total actual air-fuel mixture which enters the catalytic converter that coincides with the predetermined total target air-fuel mixture.

30. A method as claimed in claim 29, wherein the step of establishing the predetermined total air-fuel mixture ratio comprises setting the target total air-fuel mixture ratio so that it becomes leaner with a direct correlation with a reduction in catalytic converter temperature Tcat.

31. A method as claimed in claim 29, wherein the step of establishing the total air-fuel mixture ratio comprises setting the target total air-fuel mixture ratio so that it varies with a direct correlation with a change in catalytic converter temperature Tcat.

32. A method as claimed in claim 29, wherein the step of establishing the total air-fuel mixture ratio comprises setting the target total air-fuel mixture ratio so that it varies with a direct one-to-one correlation with a change in catalytic converter temperature Tcat.

* * * * *